United States Patent
Smith (12)

(10) Patent No.: US 9,390,447 B1
(45) Date of Patent: Jul. 12, 2016

(54) INSERTION OF MEDIA RECOMMENDATIONS

(71) Applicant: Amazon Technologies, Inc., Reno, NV (US)

(72) Inventor: Brent Russell Smith, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 347 days.

(21) Appl. No.: 13/705,460

(22) Filed: Dec. 5, 2012

(51) Int. Cl.
*H04N 21/466* (2011.01)
*G06Q 30/06* (2012.01)
*H04N 21/25* (2011.01)

(52) U.S. Cl.
CPC ......... *G06Q 30/0631* (2013.01); *H04N 21/251* (2013.01); *H04N 21/252* (2013.01); *H04N 21/466* (2013.01); *H04N 21/4667* (2013.01); *H04N 21/4668* (2013.01)

(58) Field of Classification Search
CPC .......... H04N 21/466–21/4668; H04N 21/251; H04N 21/252

USPC ...................................................... 725/32, 35
See application file for complete search history.

(56) References Cited

U.S. PATENT DOCUMENTS

| | | | | |
|---|---|---|---|---|
| 2011/0282745 | A1* | 11/2011 | Meoded ............. | G06Q 30/0264 705/14.61 |
| 2012/0042339 | A1* | 2/2012 | Kitts ................. | H04N 21/25866 725/35 |
| 2012/0066705 | A1* | 3/2012 | Harada .............. | H04N 21/4662 725/12 |
| 2012/0151511 | A1* | 6/2012 | Bernard ................ | H04H 60/37 725/10 |
| 2012/0197897 | A1* | 8/2012 | Knight et al. ................. | 707/740 |
| 2012/0254925 | A1* | 10/2012 | Nassiri ............. | 725/92 |
| 2013/0198013 | A1* | 8/2013 | Shehan et al. ............ | 705/14.73 |

* cited by examiner

*Primary Examiner* — Robert Hance
(74) *Attorney, Agent, or Firm* — Thomas | Horstemeyer, LLP (57) ABSTRACT

Disclosed are various embodiments for a recommendation insertion application. Instances of abandonment for media content are aggregated. A recommendation insertion point is calculated as a function of the instances of abandonment. A recommendation for suggested content is inserted into the media content at the recommendation insertion point.

20 Claims, 5 Drawing Sheets

INSERTION OF MEDIA RECOMMENDATIONS

BACKGROUND

Consumed media content may include recommendations for other suggested content. Determining the placement of these recommendations must be optimized to ensure their viewing by a user without disrupting the media experience.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Digital content providers may insert recommendations for media content available for purchase or rental into actively consumed media. For example, a recommendation may be inserted into video content suggesting the purchase of related videos in a series or other video based on user preferences. In such an example, the recommendation may be in the form of a popup or menu element overlayed onto the video content. For an ebook, a recommendation may be inserted inline into the text, or as a popup, menu element, or other form. Problems can arise in determining the location in the progression of the media content to insert these recommendations.

Inserting a recommendation into media too early may disrupt the user experience. For example, a popup on a video appearing during a pivotal scene may result in user dissatisfaction, decreasing the likelihood of future purchases. For text or ebooks, an inline recommendation inserted during an engaging scene may take the user out of the reading experience, again resulting in user dissatisfaction. Recommendations may also be inserted too late. For example, a video recommendation inserted late into or after the credits may never be encountered by users who typically end the video when the credits begin. For text, inserting a recommendation after a lengthy appendix or bibliography may not be seen by users who stop reading after the main portion of the text.

A recommendation insertion application can generate optimal recommendation insertion points as a function of aggregated instances of abandonment. The recommendation insertion application can obtain information from clients indicating points at which a user abandons consumed media content. Instances of abandonment may include the last watched moment of video, the last read portion of text, or other data. These instances of abandonment can be modeled to determine a period of increased frequency of abandonment. The recommendation insertion point can then be determined with respect to this period of increased frequency. Additionally, individual user viewing habits may also be used to generate the recommendation insertion point.

In the following discussion, a general description of the system and its components is provided, followed by a discussion of the operation of the same.

Figure 1:
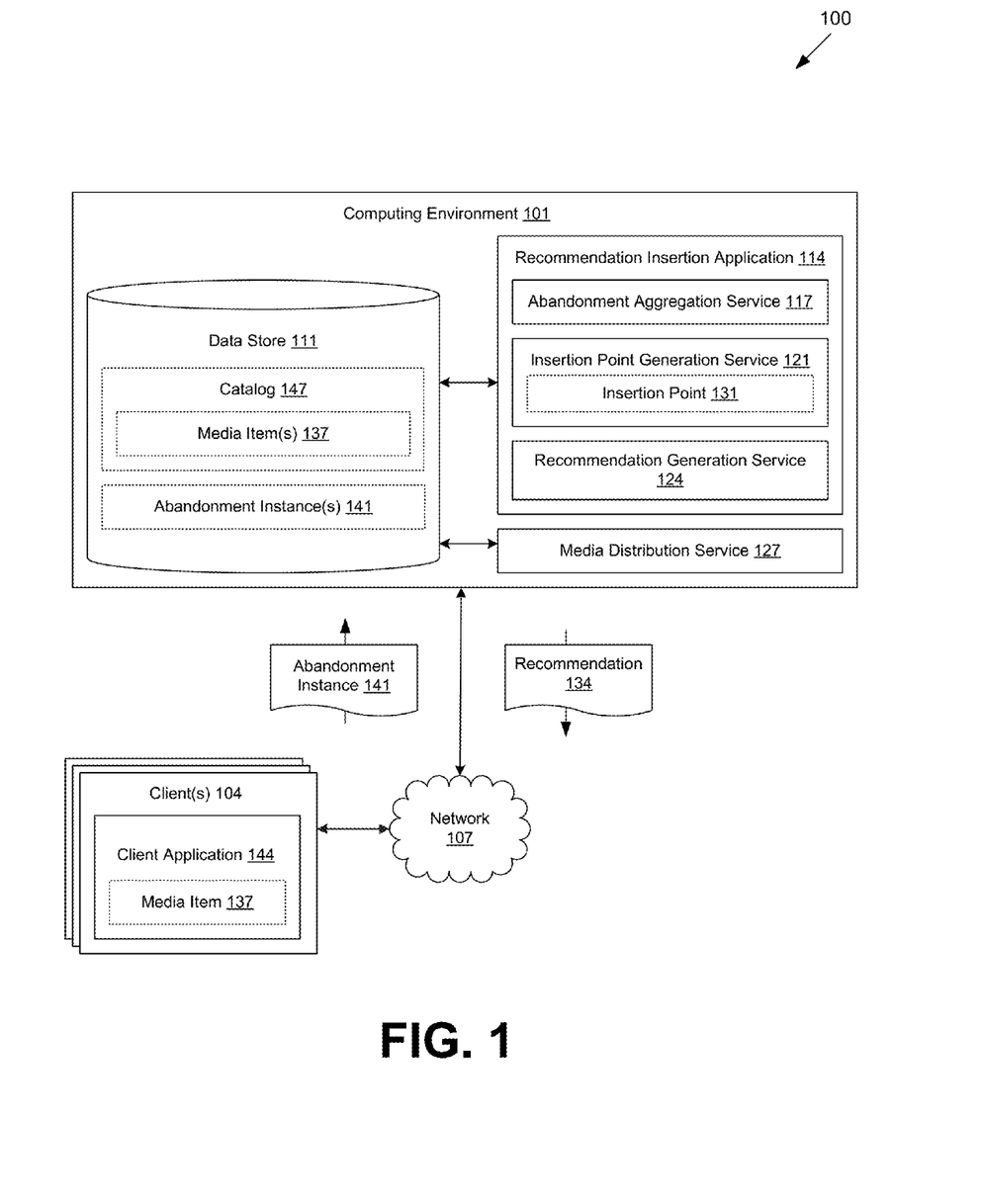
FIG. 1 is a drawing of a networked environment according to various embodiments of the present disclosure.

With reference to FIG. 1, shown is a networked environment 100 according to various embodiments. The networked environment 100 includes a computing environment 101, and a client 104, which are in data communication with each other via a network 107. The network 107 includes, for example, the Internet, intranets, extranets, wide area networks (WANs), local area networks (LANs), wired networks, wireless networks, or other suitable networks, etc., or any combination of two or more such networks.

The computing environment 101 may comprise, for example, a server computer or any other system providing computing capability. Alternatively, the computing environment 101 may employ a plurality of computing devices that may be employed that are arranged, for example, in one or more server banks or computer banks or other arrangements. Such computing devices may be located in a single installation or may be distributed among many different geographical locations. For example, the computing environment 101 may include a plurality of computing devices that together may comprise a cloud computing resource, a grid computing resource, and/or any other distributed computing arrangement. In some cases, the computing environment 101 may correspond to an elastic computing resource where the allotted capacity of processing, network, storage, or other computing-related resources may vary over time.

Various applications and/or other functionality may be executed in the computing environment 101 according to various embodiments. Also, various data is stored in a data store 111 that is accessible to the computing environment 101. The data store 111 may be representative of a plurality of data stores 111 as can be appreciated. The data stored in the data store 111, for example, is associated with the operation of the various applications and/or functional entities described below.

The components executed on the computing environment 101, for example, include a recommendation insertion application 114 having an abandonment aggregation service 117, insertion point generation service 121, and recommendation generation service 124. Also executed in the computing environment 101 is a media distribution service 127 and other applications, services, processes, systems, engines, or functionality not discussed in detail herein.

The recommendation insertion application 114 is executed to generate insertion points 131 for recommendations 134 to be inserted into media items 137. The abandonment aggregation service 117 obtains abandonment instances 141 associated with media items 137 from clients 104. In some embodiments, the abandonment instances 141 are communicated by a media player client application 144, functionality embedded in a media item 137 such as digital rights management, or by another approach. The abandonment instance 141 may comprise a defined position within a media item 137.

The defined position may comprise a timecode corresponding to a last viewed or furthest viewed portion of a video media item 137. The defined position may also comprise a last read or furthest read amount of text of a text or ebook media item 137. Defined positions with respect to text or ebook media items 137 may comprise varying degrees of granularity, such as a chapter number, page number, line number, percentage of text read, or another amount. With respect to a game or application media item 137, the abandonment instance 141 may comprise an amount of time played or used. The defined position may also comprise other data.

The abandonment instance 141 may also comprise a reference to an event or milestone within the consumed media item 137. For example, the abandonment instance 141 may indicate that a client 104 ceased viewing a video media item 137 ten seconds after the end credits begin. As another example, the abandonment instance may comprise an amount of text read into the appendices of an ebook media item 137. With respect to game or application media items 137, the abandonment instance 141 may comprise a milestone or achievement accomplished by a user, or another reference point within the game or application media item 137. The abandonment instance 141 may also comprise other data embodying a point at which a media item 137 ceases to be consumed by a client 104.

The insertion point generation service 121 generates an insertion point 131 for a recommendation 134 to be inserted in a media item 137 on a client 104. In some embodiments, the insertion point 131 is generated as a function of the obtained abandonment instances 141. The abandonment instances 141 used to generate the insertion point 131 may be those abandonment instances 141 obtained from the client 104, those abandonment instances 141 obtained from other clients 104 distinct from the client 104 consuming the media item 137, abandonment instances 141 obtained from a data store 111, or abandonment instances 141 obtained from other sources. The insertion point 131 may also be generated as a function of obtained consumption instances embodying a degree to which a media item 137 is consumed.

Additionally, the abandonment instances 141 used to generate an insertion point 131 for a media item 137 may comprise abandonment instances 141 associated with the media item 137. For example, the insertion point generation service 121 may generate an insertion point 131 as a function of abandonment instances 141 obtained from clients 104 having previously viewed the media item 137.

In other embodiments, the abandonment instances 141 used to generate an insertion point 131 for a media item 137 may comprise abandonment instances 141 associated with media items 137 distinct from the media item 137 for which the insertion point 131 is generated. For example, the abandonment instances 141 may be associated with media items 137 belonging to the same series of media items 137 as the media item 137 for which the insertion point 131 is generated. This may include prequels or sequels of the media item 137, media items 137 from the same creator, precedent or subsequent television episodes or short story entries, or other media items 137. Additionally, the abandonment instances 141 may be unrelated to the media item 137.

Generating the insertion point 131 may comprise generating a model of the abandonment instances 141 to determine a period of increased abandonment frequency. This may comprise, for example, a period of time or an amount of experienced content during which a significant amount of clients 104 terminate playback or consumption of a media item 137. The period of increased abandonment frequency may also be calculated as a function of an instances of consumption of a media item 137. The insertion point 131 may be generated as a function of the period of increased abandonment frequency.

For example, the insertion point 131 may be generated such that it occurs chronologically before the period of increased abandonment frequency. In other embodiments, the insertion point 131 may be generated such that it occurs within the period of increased abandonment frequency. For example, the insertion point 131 may occur within the period of increased abandonment frequency, but prior to a significant acceleration or peak in abandonment. The period of increased abandonment frequency may also be used to generate the insertion point 131 by another approach.

In some embodiments, the insertion point generation service 121 may generate the insertion point 131 as a function of consumption habits of the client 104. These consumption habits may be embodied in user preferences, abandonment instances 141, or other data. For example, consumption habits may indicate that the user always watches the credits of a movie media item 137, which may be a statistical outlier with respect to other abandonment instances 141. Other data may also be used to generate the insertion point 131.

The recommendation generation service 124 generates the recommendation 134 for communication to the client 104. This may comprise determining a suggested media item 137 for the recommendation 134. The suggested media item 137 may be generated as a function of the media item 137 into which the recommendation 134 is inserted. For example, the suggested media item 137 may comprise the next media item 137 in a sequential series. The suggested media item 137 may also comprise a media item 137 sharing a creator or other factor with the media item 137 into which the recommendation 134 is inserted.

Additionally, the suggested media item 137 may be determined as a function of the abandonment instances 141. For example, if a client 104 is viewing a video with a high occurrence of early abandonment, indicating a dislike by other users, then the suggested media item 137 may comprise a media item 137 having a higher customer preference. The suggested media item 137 may be determined as a function of other data as well.

After determining the suggested media item 137, the recommendation generation service 124 communicates the recommendation 134 to the client 104. This may comprise communicating data in response to an application program interface call executed by the client 104. This may also comprise encoding a popup or graphical user interface element for rendering by the client 104. Additionally, this may comprise inserting the recommendation 134 into the media item 137 and communicating the media item 137 to the client 104 responsive to a request to obtain or consume the media item 137. Other approaches may also be used to communicate the recommendation 134 to the client 104.

The media distribution service 127 facilitates the obtaining of media items 137 by clients 104. This may include consummation of financial transactions relating to the rental or purchase of media items 137. This may also comprise communicating suggested media items 137 to the client 104 responsive to an acceptance of a recommendation 134.

The data stored in the data store 111 includes, for example, a catalog 147 having media items 137, abandonment instances 141, and potentially other data. The catalog 147 organizes and facilitates the access to media items 137 by the media distribution service 127. Media items 137 comprise digital files which contain audio, visual, or other functionality to be experienced by a user. Examples of media items 137 include audio files, video files, ebooks, text files, games, applications, audiovisual presentations, or other media.

The client 104 is representative of a plurality of client devices that may be coupled to the network 107. The client 104 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability.

The client 104 may be configured to execute various applications such as a client application 144 and/or other applications. The client application 144 may be executed in a client 104, for example, to access network content served up by the computing environment 101 and/or other servers. To this end, the client application 144 may comprise, for example, a browser, a dedicated application, etc. The client 104 may be configured to execute applications beyond the client application 144 such as, for example, email applications, social networking applications, word processors, spreadsheets, and/or other applications.

Next, a general description of the operation of the various components of the networked environment 100 is provided. To begin, the abandonment aggregation service 117 obtains abandonment instances 141 from clients 104 via the network 107. Communicating the abandonment instance 141 may be facilitated by a client application 144 executing a media item 137, or by another approach. For example, the client 144 may maintain a log which comprises data indicating the last experienced or furthest experienced point in an executed media item 137. The log may be updated at regular intervals, responsive to some event such as a page turn of an ebook, or by another approach. The abandonment instance 141 may be communicated responsive to some event such as closing a client application 144, shutting down or putting to sleep a client 104, or by another approach.

Next, the recommendation insertion application 114 generates an insertion point 131 for a recommendation 134 to be inserted in a media item 137 consumed on a client 104. Generating the insertion point 131 may be performed responsive to a purchase or rental of the media item 137, initiation of consumption of the media item 137 such as opening an ebook media item 137 or beginning playback of a video media item 137, or responsive to some other event.

The insertion point generation service 121 may generate the insertion point 131 as a function of the aggregated abandonment instances 141, user consumption habits, user preferences, or other data. The insertion point 131 may comprise a defined chronological point with respect to the media item 137 such as a page number, percentage of text read, or timecode with respect to video or audio. The insertion point 131 may also comprise a reference to a milestone to be experienced with respect to the media item 137, such as a predefined amount of time after credits begin in a video item or after a scene or plot point of an ebook, an obtained achievement in a game, or another milestone. The insertion point 131 may comprise other data, as well.

Next, the recommendation generation service 124 determines a suggest media item 137 to be recommended by the recommendation 134. The suggested media item 137 may be determined as a function of the media item 137 into which the recommendation 134 will be inserted, such as a next media item 137 in a sequenced series of media items 137. The suggested media item 137 may also be determined as a function of the aggregated abandonment instances 141. For example, the abandonment instances 141 may indicate that the next sequential media item 137 is quickly abandoned, indicating customer dissatisfaction, and a distinct media item 137 is recommended instead. User purchase history or other data may also be used to determine the suggested media item 137.

After the suggested media item 137 has been determined, the recommendation generation service 124 communicates the recommendation 134 to the client 104. This may comprise communicating or encoding data responsive to an application program interface call executed by the client 104 during the consumption of the media item 137. This may also comprise modifying a media item 137 purchased through the media distribution service 127 prior to downloading by the client 104. Other approaches may also be used to communicate the recommendation 134 to the client 104.

After the client 104 has obtained the recommendation 134, the recommendation is presented to the user of the client 104 responsive to the client 104 reaching the insertion point 131. Presenting the recommendation 134 may comprise encoding for rendering a popup or other user interface element embodying the recommendation 134. Presenting the recommendation 134 may also comprise rendering a media element associated with the media item 137, such as rendering in-line text in an ebook media item 137 or rendering a video element encoded in a video media item 137. Other approaches may also be used to present the recommendation 134 to the client 104.

The client 104 may then initiate an obtaining of the suggested media item 137. This may comprise selecting a button or user interface element associated with the recommendation 134, or by another approach. This may also comprise consummating a sale or rental of the suggested media item 134 through the media distribution service 127. Other approaches may also be used to obtain the suggested media item 137.

Figure 2A:
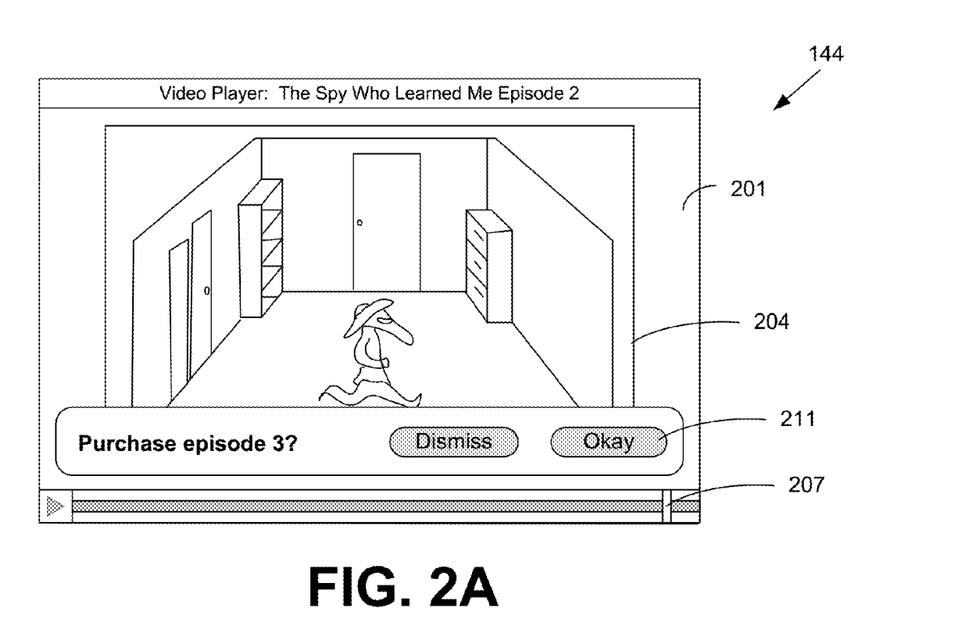
FIG. 2A is a drawing of an example of a user interface rendered by a client in the networked environment of FIG. 1 according to various embodiments of the present disclosure.

Referring next to FIG. 2A, shown is a user interface embodying a rendering of a recommendation 134 (FIG. 1) in a video media item 137 (FIG. 1) responsive to a video player client application 144 (FIG. 1) reaching the insertion point 131 (FIG. 1) during playback by a client 104 (FIG. 1). Item 201 is a user interface rendered by a dedicated client application 144. Item 201 may also represent a user interface rendered by a browser client application 144 or another client application 144. Item 204 is a frame for rendering a video media item 137. Item 207 is a slider indicating the current progress of playback for the video media item 137. Item 211 is a popup embodying a recommendation 134 being rendered responsive to the current progress of playback reaching the insertion point 131. Contained within the popup is a solicitation to purchase the next episode of the television series being played, as well as buttons to either dismiss the popup or initiate a purchase of the suggested media item 137.

Figure 2B:
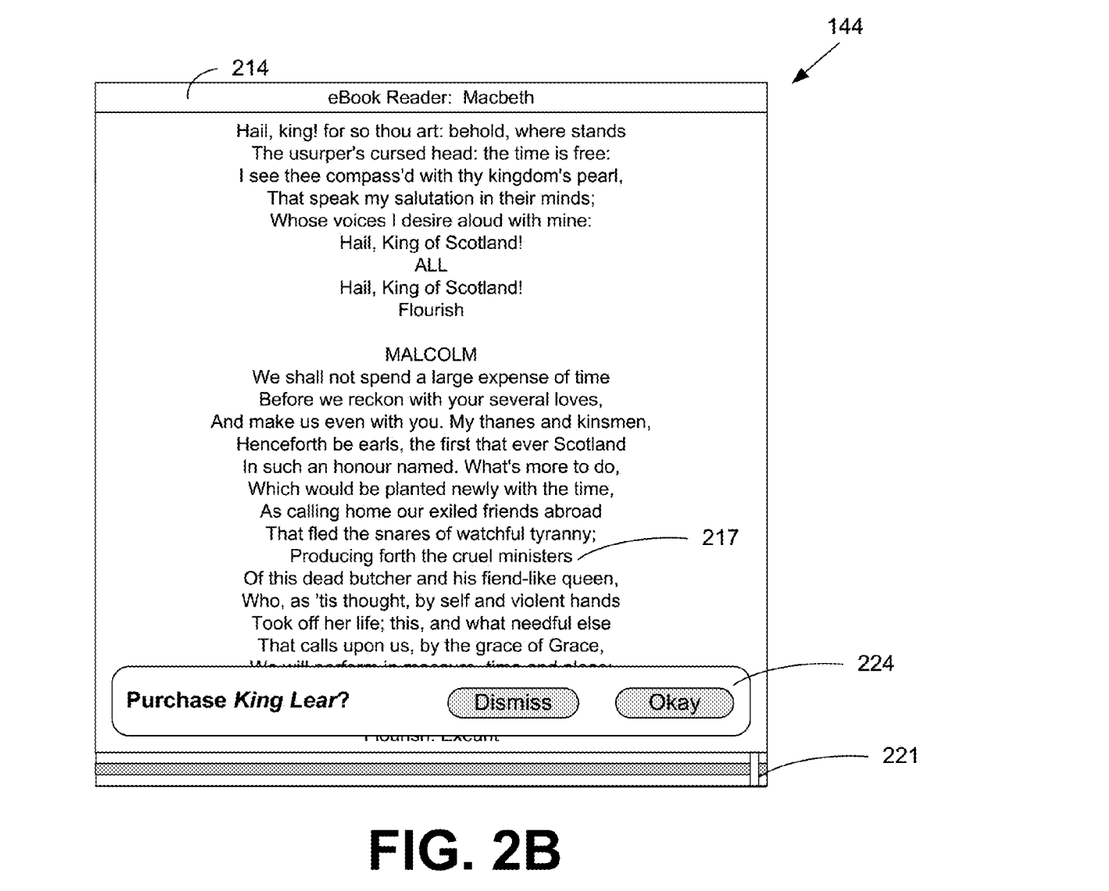
FIG. 2B is a drawing of an example of a user interface rendered by a client in the networked environment of FIG. 1 according to various embodiments of the present disclosure.

Referring next to FIG. 2B, shown is a user interface embodying a rendering of a recommendation 134 (FIG. 1) in an ebook media item 134 (FIG. 1) responsive to a client 104 (FIG. 1) reaching the insertion point 131 (FIG. 1) during reading. Item 214 is a user interface rendered by a dedicated client application 144. Item 201 may also represent a display of a dedicated ebook reader client 104. Item 217 is rendered text of the ebook media item 137. Item 221 is a slider indicating the current progress of reading for the ebook media item 137. Item 224 is a popup embodying a recommendation 134 being rendered responsive to the current progress of reading reaching the insertion point 131. Contained within the popup is a solicitation to purchase a related ebook media item 137, as well as buttons to either dismiss the popup or initiate a purchase of the suggested media item 137 though the media distribution service 127 (FIG. 1).

Figure 3:
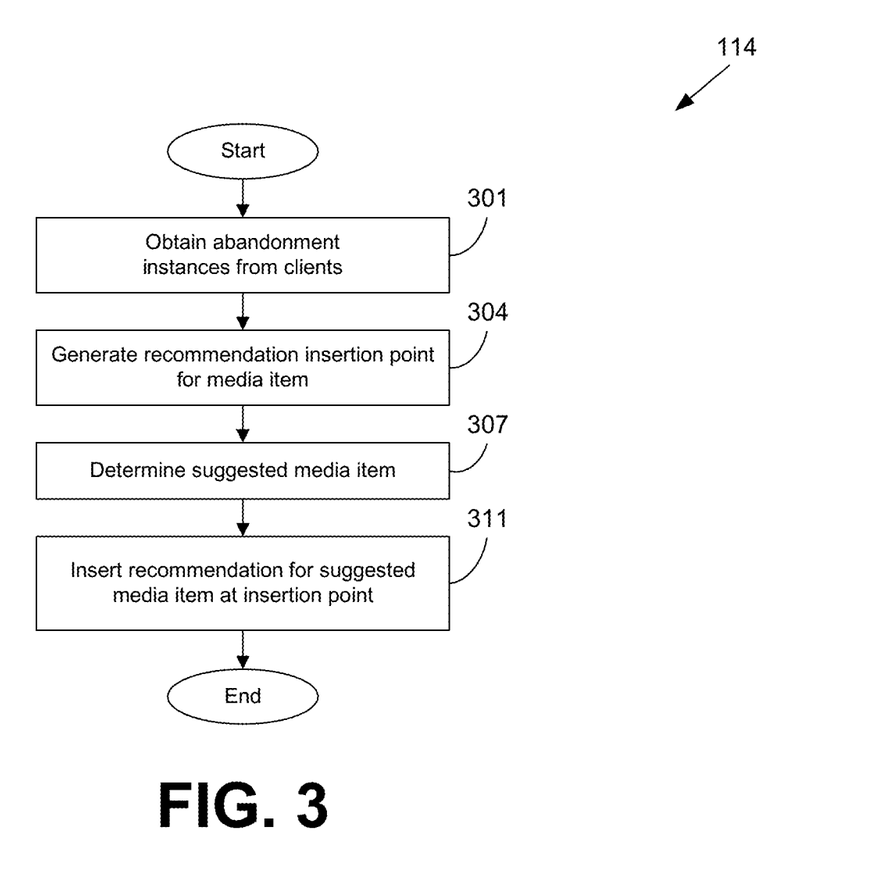
FIG. 3 is a flowchart illustrating one example of functionality implemented as portions of a recommendation insertion application executed in a computing environment in the networked environment of FIG. 1 according to various embodiments of the present disclosure.

Referring next to FIG. 3, shown is a flowchart that provides one example of the operation of a portion of the recommendation insertion application 114 (FIG. 1) according to various embodiments. It is understood that the flowchart of FIG. 3 provides merely an example of the many different types of functional arrangements that may be employed to implement the operation of the portion of the recommendation insertion application 114 as described herein. As an alternative, the flowchart of FIG. 3 may be viewed as depicting an example of steps of a method implemented in the computing environment 101 (FIG. 1) according to one or more embodiments.

Beginning with box 301, the abandonment aggregation service 117 (FIG. 1) of the recommendation insertion application 114 obtains abandonment instances 141 (FIG. 1) from clients 104 (FIG. 1). In some embodiments, this may comprise obtaining log data indicating a last or furthest experienced point of a media item 137 (FIG. 1). In other embodiments, this may comprise a client 104 executing an exposed application program interface call. Other approaches may also be used to obtain abandonment instances 141 from clients 104.

Next, in box 304, the insertion point generation service 121 (FIG. 1) generates an insertion point 131 (FIG. 1) for a media item 137. The insertion point 131 may be generated as a function of the obtained abandonment instances 141. The abandonment instances 141 may be associated with the media item 137 or associated with distinct media items 137. The abandonment instances 141 may also be associated with the client 104, or distinct clients 104. The insertion point 131 may also be generated as a function of user consumption habits, user preferences, or other data.

In box 307, the recommendation generation service 124 (FIG. 1) determines a suggested media item 137 to be recommended by the recommendation 134 (FIG. 1). The suggested media item 137 may be determined as a function of the consumed media item 137 into which the recommendation 134 will be inserted. For example, the suggested media item 137 and the consumed media item 137 may belong to the same series, share a common creator, or have another association. The suggested media item 137 may also be determined as a function of the abandonment instances 141. For example, the suggested media item 137 may comprise a media item 137 having abandonment instances 141 indicating a total or majority consumption of the media item 137 indicating a greater customer satisfaction. The suggested media item 137 may also be determined as a function of other data or factors.

In box 311 the recommendation generation service 124 inserts the recommendation 134 at the insertion point 131. This may comprise communicating data embodying the recommendation 134 to be rendered by a client application 144 (FIG. 1) such as a popup or user interface element. This may also comprise modifying the media item 137 prior to a client 104 downloading the media item 137 from a media distribution service 127 responsive to an initiation of a download of the media item 137. For example, a recommendation 134 could be inserted inline into a text or ebook media item 137 upon purchase through the media distribution service 127. Other approaches may also be used to insert the recommendation 134 into the consumed media item 137.

Figure 4:
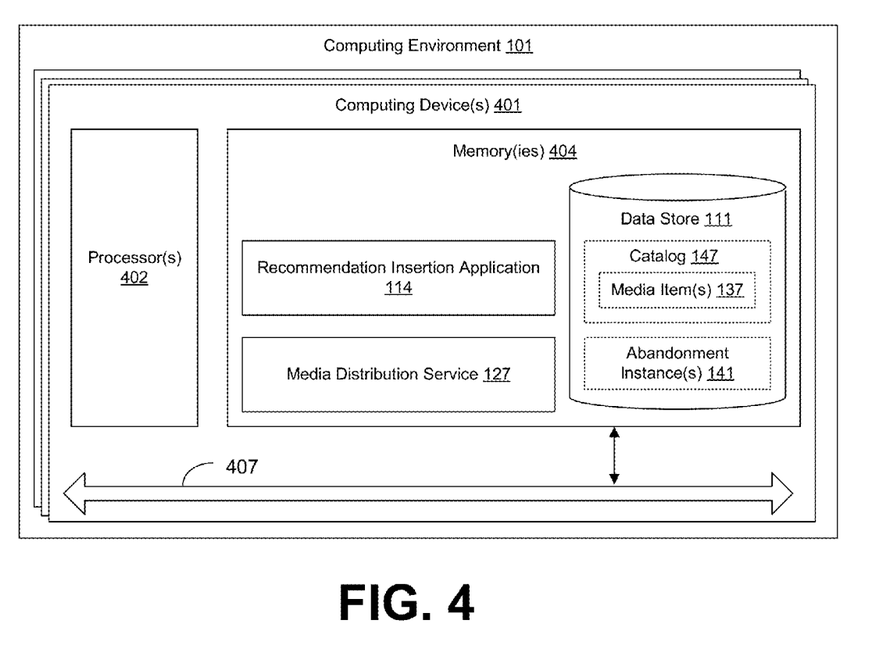
FIG. 4 is a schematic block diagram that provides one example illustration of a computing environment employed in the networked environment of FIG. 1 according to various embodiments of the present disclosure.

With reference to FIG. 4, shown is a schematic block diagram of the computing environment 101 according to an embodiment of the present disclosure. The computing environment 101 includes one or more computing devices 401. Each computing device 401 includes at least one processor circuit, for example, having a processor 402 and a memory 404, both of which are coupled to a local interface 407. To this end, each computing device 401 may comprise, for example, at least one server computer or like device. The local interface 407 may comprise, for example, a data bus with an accompanying address/control bus or other bus structure as can be appreciated.

Stored in the memory 404 are both data and several components that are executable by the processor 402. In particular, stored in the memory 404 and executable by the processor 402 are a recommendation insertion application 114 (FIG. 1), a media distribution service 127 (FIG. 1), and potentially other applications. Also stored in the memory 404 may be a data store 111 (FIG. 1) storing a catalog 147 (FIG. 1) of media items 137 (FIG. 1), abandonment instances 141 (FIG. 1) and other data. In addition, an operating system may be stored in the memory 404 and executable by the processor 402.

It is understood that there may be other applications that are stored in the memory 404 and are executable by the processor 402 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 404 and are executable by the processor 402. In this respect, the term "executable" means a program file that is in a form that can ultimately be run by the processor 402. Examples of executable programs may be, for example, a compiled program that can be translated into machine code in a format that can be loaded into a random access portion of the memory 404 and run by the processor 402, source code that may be expressed in proper format such as object code that is capable of being loaded into a random access portion of the memory 404 and executed by the processor 402, or source code that may be interpreted by another executable program to generate instructions in a random access portion of the memory 404 to be executed by the processor 402, etc. An executable program may be stored in any portion or component of the memory 404 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 404 is defined herein as including both volatile and nonvolatile memory and data storage components. Volatile components are those that do not retain data values upon loss of power. Nonvolatile components are those that retain data upon a loss of power. Thus, the memory 404 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 402 may represent multiple processors 402 and/or multiple processor cores and the memory 404 may represent multiple memories 404 that operate in parallel processing circuits, respectively. In such a case, the local interface 407 may be an appropriate network that facilitates communication between any two of the multiple processors 402, between any processor 402 and any of the memories 404, or between any two of the memories 404, etc. The local interface 407 may comprise additional systems designed to coordinate this communication, including, for example, performing load balancing. The processor 402 may be of electrical or of some other available construction.

Although the recommendation insertion application 114, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 3 shows the functionality and operation of an implementation of portions of the recommendation insertion application 114. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 402 in a computer system or other system. The machine code may be converted from the source code, etc. If embodied in hardware, each block may represent a circuit or a number of interconnected circuits to implement the specified logical function(s).

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. Further, in some embodiments, one or more of the blocks shown in FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including a recommendation insertion application 114, that comprises software or code can be embodied in any non-transitory computer-readable medium for use by or in connection with an instruction execution system such as, for example, a processor 402 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, the program, when executed, causing the at least one computing device to at least:
   obtain from a plurality of client devices a plurality of instances of abandonment associated with a video content;
   calculate a period of increased frequency of instances of abandonment as a function of the instances of abandonment and a plurality of instances of consumption associated with the video content;
   determine a recommendation insertion point within the period of increased frequency as a function of the instances of abandonment, the instances of consumption, and a viewing habit of a user of one of the client devices;
   determine, in response to the video content being associated with early abandonment, a suggested video content based at least in part on the instances of abandonment, the suggested video content being associated with later abandonment than the video content;
   insert a recommendation for the suggested video content into the video content at the recommendation insertion point responsive to the video content being viewed on the one of the client devices; and
   wherein the recommendation comprises a solicitation to purchase access to the suggested video content.

2. The non-transitory computer-readable medium of claim 1, wherein the instances of abandonment are further associated with media content distinct from the video content.

3. A system, comprising:
   at least one computing device
   configured to at least:
      aggregate at least one instance of media abandonment;
      determine a recommendation insertion point of a media content as a function of the at least one instance of media abandonment;

determine, in response to the media content being associated with early abandonment, a recommended media content based at least in part on the at least one instance of media abandonment, the recommended media content being associated with later abandonment than the media content;

insert a recommendation for the recommended media content at the recommendation insertion point of the media content; and wherein the media content is consumed on a client device.

4. The system of claim 3, wherein the client device is one of a plurality of client devices, and the at least one instance of media abandonment is at least one of a plurality of instances of media abandonment aggregated from the client devices.

5. The system of claim 3, wherein the at least one instance of media abandonment is at least one of a plurality of instances of media abandonment, and determining the recommendation insertion point further comprises:

detecting a period of increased abandonment frequency with respect to the instances of media abandonment; and determining the recommendation insertion point as a point within the period of increased abandonment frequency.

6. The system of claim 3, wherein the at least one instance of media abandonment is at least one of a plurality of instances of media abandonment, and determining the recommendation insertion point further comprises:

detecting a period of increased abandonment frequency with respect to the instances of media abandonment; and determining the recommendation insertion point as a point before the period of increased abandonment frequency.

7. The system of claim 3, wherein the at least one instance of media abandonment is at least one of a plurality of instances of media abandonment, the client device is one of a plurality of client devices, and aggregating the instances of media abandonment further comprises obtaining one of the instances of media abandonment from one of the client devices.

8. The system of claim 3, wherein the recommendation insertion point comprises a defined point in the media content.

9. The system of claim 3, wherein the recommendation insertion point comprises a milestone with respect to a consumption of the media content and an offset.

10. The system of claim 3, wherein the at least one instance of abandonment is associated with a previously consumed content, and the at least one computing device is further configured to at least determine the recommended media content as a function of the previously consumed content.

11. The system of claim 3, wherein the media content comprises a video, and the recommendation insertion point comprises a time code associated with the video.

12. The system of claim 3, wherein the media content comprises an eBook, and the recommendation insertion point comprises an amount of read text.

13. The system of claim 3, wherein the media content is a first media content, and the at least one instance of media abandonment corresponds to a second media content distinct from the first media content.

14. A method, comprising:

aggregating, in a computing device, a plurality of instances of media abandonment;

determining, in the computing device, a recommendation insertion point associated with a media content as a function of the instances of media abandonment;

determining, in the computing device, in response to the media content being associated with early abandonment, suggested content based at least in part on the plurality of instances of media abandonment, the suggested content being associated with later abandonment than the media content;

inserting, in the computing device, into the media content, a recommendation for suggested content at the insertion point;

wherein a user consuming the media content on a client device is presented with the recommendation responsive to accessing the recommendation insertion point; and wherein a subset of the instances of media abandonment are associated with the media content.

15. The method of claim 14, wherein the subset of the instances of media abandonment is a first subset of the instances of media abandonment, and a second subset of the instances of media abandonment is associated with a previously consumed media content.

16. The method of claim 14, further comprising:

calculating, in the computing device, a period of increased frequency of the instances of media abandonment; and wherein the period of increased frequency includes the recommendation insertion point.

17. The method of claim 14, wherein the recommendation insertion point is further determined as a function of media consumption habits of the user.

18. The method of claim 14, wherein the client device is one of a plurality of client devices, and wherein the aggregating further comprises obtaining, in the computing device, the instances of media abandonment from the client devices.

19. The method of claim 14, wherein the media content is a first one of a plurality of related media contents, and the suggested content is a second one of the related media contents.

20. The method of claim 14, wherein the subset of the instances of media abandonment is a first subset of instances of media abandonment, the media content is a first media content, and a second subset of the instances of media abandonment is associated with a second media content distinct from the first media content.

* * * * *